US012669420B2

(12) United States Patent　　　(10) Patent No.: US 12,669,420 B2
Chokyu et al.　　　　　　　　　　(45) Date of Patent: Jun. 30, 2026

(54) ELECTRODE INK QUALITY DETERMINATION METHOD, AND MEASUREMENT SYSTEM

(71) Applicant: HONDA MOTOR CO., LTD., Tokyo (JP)

(72) Inventors: Shinsuke Chokyu, Tokyo (JP); Kazutoshi Mameda, Tokyo (JP); Nobuyoshi Muromoto, Tokyo (JP); Tsuyoshi Kokusho, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 264 days.

(21) Appl. No.: 18/281,004

(22) PCT Filed: Mar. 12, 2021

(86) PCT No.: PCT/JP2021/010049
§ 371 (c)(1),
(2) Date: Sep. 8, 2023

(87) PCT Pub. No.: WO2022/190354
PCT Pub. Date: Sep. 15, 2022

(65) Prior Publication Data
US 2024/0151620 A1　　May 9, 2024

(51) Int. Cl.
*G01N 9/26* (2006.01)
*H01M 4/88* (2006.01)
(52) U.S. Cl.
CPC ............... *G01N 9/26* (2013.01); *H01M 4/88* (2013.01)
(58) Field of Classification Search
CPC .................................. G01N 9/26; H01M 4/88
See application file for complete search history.

(56) References Cited

U.S. PATENT DOCUMENTS

2022/0283069 A1* 9/2022 Mameda ................ G01N 11/08
2023/0235467 A1* 7/2023 Shirataki ............... C25B 11/065
　　　　　　　　　　　　　　　　204/252
2024/0159637 A1* 5/2024 Chokyu ............. H01M 4/8828

FOREIGN PATENT DOCUMENTS

CN　　106124741 A　　11/2016
CN　　108072588 A　　5/2018
(Continued)

OTHER PUBLICATIONS

PCT/ISA/210 from International Application PCT/JP2021/010049 with the English translation thereof.
(Continued)

*Primary Examiner* — Natalie Huls
(74) *Attorney, Agent, or Firm* — Carrier, Shende & Associates P.C.; Joseph P. Carrier; Fulchand P. Shende

(57) ABSTRACT

In the present invention, an electrode ink has formed therein: a primary aggregate in which ionomers are adsorbed around catalyst carriers, and as a result thereof, aggregation between catalyst carriers is prevented; and a secondary aggregate that is formed when catalyst carriers aggregate with each other. In an electrode ink quality determination method, a measurement system detects an index that correlates with the amount of the primary aggregate and the amount of the secondary aggregate in the electrode ink. An information processing device: estimates the conditions of the primary aggregate and the secondary aggregate in the electrode ink on the basis of the index detected; and determines that the greater the amount of the primary aggregate included is, relative to the amount of the secondary aggregate, the better the quality of the electrode ink is.

5 Claims, 6 Drawing Sheets

(56)         References Cited

FOREIGN PATENT DOCUMENTS

| CN | 108844859 | A |   | 11/2018 |
|----|-----------|---|---|---------|
| JP | 2002-168750 | A |   | 6/2002 |
| JP | 2009-181745 | A |   | 8/2009 |
| JP | 2013051173 | A | * | 3/2013 |
| JP | 2013-072679 | A |   | 4/2013 |
| JP | 2014-167402 | A |   | 9/2014 |
| JP | 2014-212017 | A |   | 11/2014 |
| JP | 2016219154 | A | * | 12/2016 |
| JP | 2017084502 | A | * | 5/2017 |

OTHER PUBLICATIONS

Office Action and Search Report dated Apr. 20, 2026 in corresponding Chinese Application No. 202180095605.1.

\* cited by examiner

FIG. 5

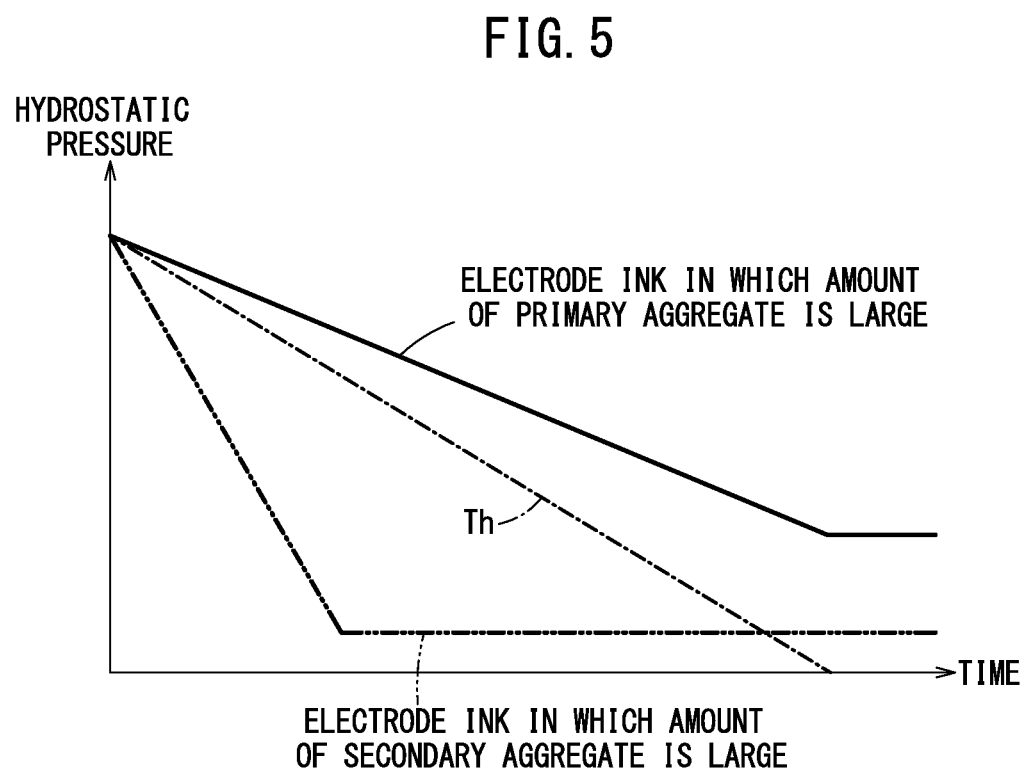

HYDROSTATIC
PRESSURE

ELECTRODE INK IN WHICH AMOUNT
OF PRIMARY AGGREGATE IS LARGE

Th

TIME

ELECTRODE INK IN WHICH AMOUNT
OF SECONDARY AGGREGATE IS LARGE

ELECTRODE INK QUALITY DETERMINATION METHOD, AND MEASUREMENT SYSTEM

TECHNICAL FIELD

The present invention relates to a method (electrode ink quality determination method) of determining a good quality of an electrode ink for forming the electrodes of a fuel cell, and to a measurement system.

BACKGROUND ART

In JP 2014-212017 A, a technique is disclosed of forming a catalyst layer for a fuel cell by coating an electrode ink (a catalyst ink) in which catalyst-carrying carbon (catalyst supports) and ionomers are mixed. Within this type of electrode ink, by the ionomers being uniformly present in a dispersive solvent, and being adsorbed around the catalyst supports, a large amount of a primary aggregate becomes included therein. Conversely, by the ionomers existing non-uniformly within the dispersive solvent and being not adsorbed around the catalyst supports, within the electrode ink, a large amount of a secondary aggregate in which the catalyst supports themselves are aggregated becomes included therein, and in accordance therewith, the amount of the primary aggregate becomes less plentiful.

When a large amount of the secondary aggregate is present in the electrode ink, defects (cracks and the like) occur on a dry coated surface after the electrode ink has been coated thereon, and the power generating area of the fuel cell narrows. In manufacturing of the fuel cells, the disposal of electrodes in which defects have occurred significantly reduces the yield at the time of manufacturing.

In this instance, as a method of evaluating the ink prior to coating thereof, as disclosed in JP 2014-167402 A, a viscosity distribution (the viscosity at a plurality of locations) of the ink which is stored in a container is measured to thereby carry out an evaluation of a state of sedimentation thereof. However, even with such an evaluation method, there is a possibility that the primary aggregate and the secondary aggregate may be uniformly distributed within the electrode ink, and it is not possible to capture a difference in the generation of the secondary aggregate (the amount of the primary aggregate and the amount of the secondary aggregate) within the electrode ink. More specifically, conventionally, it has not been possible to sufficiently determine if the electrode ink is of good quality or not prior to coating of the electrode ink.

SUMMARY OF THE INVENTION

In view of the situation described above, the present invention has the object of providing a method of determining a good quality of an electrode ink, as well as to a measurement system, which are capable of suitably determining a goodness or badness of the electrode ink prior to coating of the electrode ink, and in accordance therewith, suppressing the occurrence of defects on a dried surface after having been coated with the electrode ink.

In order to achieve the aforementioned object, a first aspect of the present invention is characterized by a method of determining a good quality of an electrode ink configured to include a plurality of catalyst supports and a plurality of ionomers, and configured to form a catalyst layer of a fuel cell, wherein, in an inner portion of the electrode ink, by adsorption of the ionomers around the catalyst supports, a primary aggregate that does not aggregate with others of the catalyst supports is formed, while on the other hand, by aggregation of the catalyst supports themselves without the ionomers around the catalyst supports, a secondary aggregate is formed, the method of determining a good quality of an electrode ink comprising the steps of detecting an index correlated with an amount of the primary aggregate and an amount of the secondary aggregate within the electrode ink, and based on the detected index, estimating a state of the primary aggregate and the secondary aggregate within the electrode ink, and as the primary aggregate becomes more plentifully contained within the electrode ink relative to the secondary aggregate, the more it is determined that the electrode ink is a good quality product.

Further, in order to achieve the aforementioned object, a second aspect of the present invention is characterized by a measurement system configured to measure a good quality of an electrode ink configured to include a plurality of catalyst supports and a plurality of ionomers, and configured to form a catalyst layer of a fuel cell, wherein, in an inner portion of the electrode ink, by adsorption of the ionomers around the catalyst supports, a primary aggregate that does not aggregate with others of the catalyst supports is formed, while on the other hand, by aggregation of the catalyst supports themselves without the ionomers around the catalyst supports, a secondary aggregate is formed, the measurement system comprising a container configured to store the electrode ink, a plurality of pressure detection units provided at a plurality of different positions in a height direction of the container, and configured to periodically detect a hydrostatic pressure of the electrode ink in a static state over a measurement period, and an information processing device configured to accumulate the hydrostatic pressure detected periodically by the plurality of the pressure detection units, wherein, based on a change over time of the hydrostatic pressure serving as an index correlated with an amount of the primary aggregate and an amount of the secondary aggregate within the electrode ink, the information processing device estimates a state of the primary aggregate and the secondary aggregate within the electrode ink, and as the primary aggregate becomes more plentifully contained within the electrode ink relative to the secondary aggregate, the more it is determined that the electrode ink is a good quality product.

In the above-described method of determining a good quality of an electrode ink, and the measurement system, it is possible to suitably determine a goodness or badness of the electrode ink prior to coating of the electrode ink, and in accordance therewith, to suppress the occurrence of defects on a dried surface after having been coated with the electrode ink.

BRIEF DESCRIPTION OF THE DRAWINGS

FIG. 5 is a graph showing a comparison between a change over time of a hydrostatic pressure of the electrode ink and a change threshold value.

DESCRIPTION OF THE PREFERRED EMBODIMENTS

Hereinafter, a description of a preferred embodiment of the present invention will be presented and described in detail below with reference to the accompanying drawings.

Figure 1:
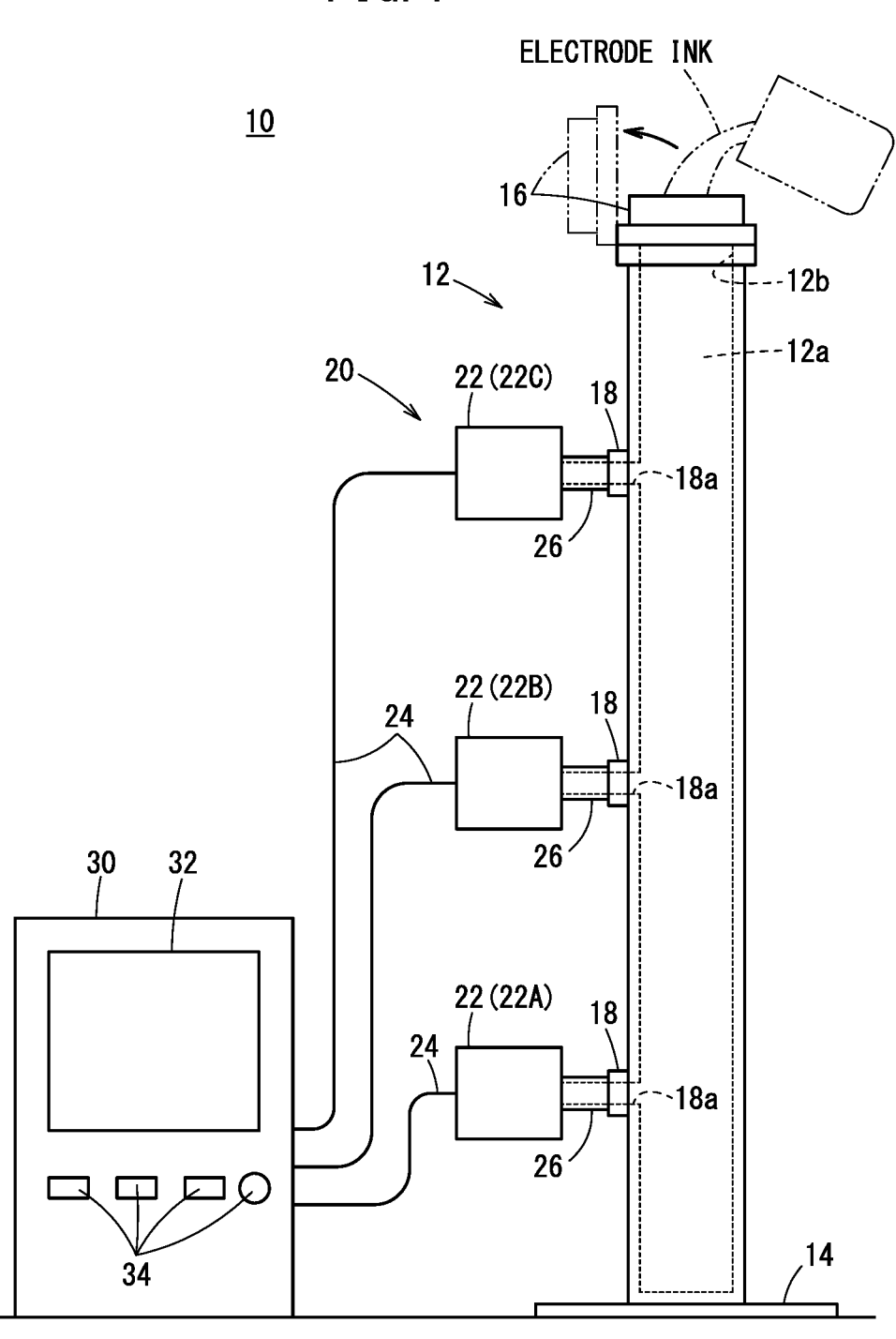
FIG. 1 is a side view showing the overall configuration of a measurement system that carries out a method of determining a good quality of an electrode ink according to an embodiment of the present invention.

As shown in FIG. 1, a method of determining a good quality of an electrode ink according to an embodiment of the present invention utilizes a measurement system 10 for measuring a sample of the electrode ink that forms a catalyst layer of a fuel cell, and thereby determines whether the electrode ink is of good quality (a good quality product or a defective product).

The electrode ink, for example, is a catalyst ink for a fuel cell electrode that contains catalyst supports CS on which a catalyst is supported, ionomers IO possessing proton conductivity (an electrolyte polymer, an electrolyte solution), and a dispersive solvent DS in which the catalyst supports CS and the ionomers IO are dispersed. As the catalyst supports CS, there can be applied ceramic or conductive carbon (including carbon fibers) on which platinum (Pt) particles are supported. The ionomers IO are ones in which a part of a hydrophobic main chain is replaced by a hydrophilic ionic group (a salt of carboxylic acid, sulfonic acid, or the like) and there can be applied as the ionomers IO a fluorine-based electrolytic polymer such as a perfluorosulfonic acid polymer or a non-fluorine-based electrolytic polymer. Water or alcohol can be applied as the dispersive solvent DS.

Manufacturing of the electrode ink is performed by mixing the catalyst supports CS, the ionomers IO, and the dispersive solvent DS at an appropriate ratio, and then, for example, carrying out pulverizing, kneading, and stirring or the like by means of a pulverizing mechanism such as a bead mill, a stirrer, or the like. Consequently, the electrode ink, in which the catalyst supports CS and the ionomers IO are dispersed in the dispersive solvent DS, is prepared. The prepared electrode ink is provided in the form of a paste. Hereinafter, the manufacturing process for preparing such an electrode ink is referred to as a kneading process.

Further, in manufacturing the electrodes of the fuel cell, during transportation of a substrate material (a polymer paste, an electrolyte membrane, etc.), the electrode ink that was prepared by the kneading process is coated on the substrate material by a die head or the like so as to be formed with a constant thickness. Consequently, the catalyst layer for the electrodes (the anode electrodes, the cathode electrodes) of the fuel cell is created. Hereinafter, the manufacturing process for creating the catalyst layer will be referred to as a coating process.

In order to measure the state of the electrode ink, the measurement system 10 is equipped with a container 12 in which the electrode ink is stored, a detection unit 20 provided to the container 12, and an information processing device 30 connected to the detection unit 20. More specifically, the measurement system 10 detects the state of the electrode ink that is stored in the container 12 by the detection unit 20, and accumulates detected measurement data in the information processing device 30. Furthermore, by analyzing the accumulated measurement data, the information processing device 30 determines the goodness or badness of the electrode ink.

The container 12 of the measurement system 10 is formed in a cylindrical shape, and includes a storage space 12a for the electrode ink on an inner side thereof. An outer circumferential surface and an inner circumferential surface of the container 12 extend linearly and in parallel along a central axis of the container 12. At a time when the measurement system 10 is used, a pedestal 14 which is provided at a lower end of the container 12 is installed on a horizontal platform, and thereby the container 12 is fixed in an upright state along the direction of gravity.

The container 12 is set to an appropriate height, in a manner so that the electrode ink that is stored in the storage space 12a becomes placed at a liquid height that does not receive an influence of an interface. For example, the height of the container 12 is preferably greater than or equal to ten times the inner diameter of the container 12. An opening 12b that communicates with the storage space 12a is provided at an upper end of the container 12, and a lid body 16 which is capable of opening and closing the opening 12b is provided. The lid body 16 is provided with a pressure releasing structure for the purpose of releasing the internal pressure of the storage space 12a.

Further, one or more ports 18 in order to attach the detection unit 20 are provided on the outer circumferential surface of the container 12. The measurement system 10 according to the present embodiment is of a configuration in which three of the pressure detection units 22 are attached as the detection unit 20, and in accordance therewith, three of the ports 18 are provided. Each of the respective ports 18 projects out for a short distance in the horizontal direction, and includes a hole portion 18a on an inner side thereof that communicates with the storage space 12a.

The container 12 is made of a metal material or a resin material, and an inner surface thereof that constitutes the storage space 12a is coated with an acid-resistant coating that does not undergo chemical deterioration due to the electrode ink. The coating material is not particularly limited, but as examples thereof, there may be cited phenol resin, unsaturated polyester resin, epoxy resin, fluororesin, polyurethane resin, and the like.

The detection unit 20 is constituted by one or more (according to the present embodiment, three) of the pressure detection units 22, which detect the pressure of the electrode ink that is stored in the storage space 12a. In order to capture a change over time in the hydrostatic pressure of the electrode ink, a pressure gauge having a sufficiently small resolution is applied to each of the pressure detection units 22. Each of the respective pressure detection units 22 is connected so as to be capable of communicating via a harness 24 (or alternatively, wirelessly) with the information processing device 30.

For example, each of the pressure detection units 22 is equipped with a connector 26 connected to one of the ports 18, a non-illustrated detector provided in a detection space within the connector 26, and a non-illustrated electronic circuit (including a sensor processor) that electrically detects a change in the detector. In a state in which the connector 26 is connected to the port 18, the electrode ink stored in the container 12 flows into the detection space, whereby the detector receives the pressure of the electrode ink from around the total periphery thereof. Consequently, each of the pressure detection units 22 periodically detects the hydrostatic pressure (the pressure) of the electrode ink, and transmits the detection result (the measurement data) to the information processing device 30. Moreover, each of the pressure detection units 22 may be constituted to include a detector that projects out from the connector 26, and the detector may be arranged in the storage space 12*a*.

The three of the pressure detection units 22 (as well as the ports 18 of the container 12) are provided at mutually different height positions along the height direction (the direction of gravity) of the container 12. Hereinafter, the three of the pressure detection units 22 are referred to as a first pressure detection unit 22A, a second pressure detection unit 22B, and a third pressure detection unit 22C, sequentially in this order from a lower side to an upper side of the container 12. The first pressure detection unit 22A is disposed in a lower portion in the case that the container 12 is divided into three equal parts in a height direction. The second pressure detection unit 22B is disposed in an intermediate portion in the case that the container 12 is divided into three equal parts in a height direction. The third pressure detection unit 22C is disposed in an upper portion in the case that the container 12 is divided into three equal parts in a height direction. Further, the interval between the first pressure detection unit 22A and the second pressure detection unit 22B, and the interval between the second pressure detection unit 22B and the third pressure detection unit 22C substantially coincide with each other.

More specifically, the first pressure detection unit 22A detects the hydrostatic pressure in the lower portion of the container 12, and transmits first measurement data indicating the detected hydrostatic pressure to the information processing device 30. The second pressure detection unit 22B detects the hydrostatic pressure in the intermediate portion of the container 12, and transmits second measurement data indicating the detected hydrostatic pressure to the information processing device 30. The third pressure detection unit 22C detects the hydrostatic pressure in the upper portion of the container 12, and transmits third measurement data indicating the detected hydrostatic pressure to the information processing device 30.

The information processing device 30 includes at least one processor, a memory, an input/output interface, an electronic circuit, and a timer (none of which are shown). By the at least one processor executing non-illustrated programs stored in the memory, a plurality of functional blocks for controlling the operation of the measurement system 10 and further for processing respective pieces of information are formed inside the information processing device 30. Moreover, at least a portion of each of the functional blocks may be constituted by an integrated circuit such as an ASIC (Application Specific Integrated Circuit), an FPGA (Field Programmable Gate Array) or the like, or an electronic circuit containing a discrete device. Various types of drives (an HDD, an SSD, or the like) can be applied as the memory, or the memory can include a memory associated with a processor, an integrated circuit, or the like.

An input/output interface of the information processing device 30 is connected to a monitor 32 that displays information of the information processing device 30, and an operation unit 34 (buttons, a keyboard, a mouse, and the like) for the purpose of operating the information processing device 30.

The information processing device 30 receives the first to third measurement data at predetermined timings, and stores the first to third measurement data in the memory in association with times measured within the device. The first to third measurement data are accumulated in the memory by the information processing device 30 over a long period of time (for example, greater than or equal to one week).

Based on the accumulated first to third measurement data, the information processing device 30 analyzes the changes over time of the hydrostatic pressure P of the electrode ink at each of the liquid heights. In this instance, the hydrostatic pressure P of the liquid can be expressed by the following Equation (1).

$$P = \rho \times g \times h \qquad (1)$$

(ρ: density, g: gravitational acceleration, h: liquid height)

In the case that a predetermined amount of the electrode ink is stored in the container 12, since the gravitational acceleration g and the liquid height h are constant, the change over time of the hydrostatic pressure P represents a change over time of the density ρ of the electrode ink. The density ρ of the electrode ink changes depending on the state of a primary aggregate 40 and a secondary aggregate 42 within the electrode ink (refer to FIG. 2A and FIG. 2C). Accordingly, based on the changes over time of the hydrostatic pressure P, the information processing device 30 can approximately estimate the state of the primary aggregate 40 and the secondary aggregate 42 within the electrode ink.

Next, a description will be given specifically concerning the primary aggregate 40 and the secondary aggregate 42 that are formed in the electrode ink, and a description will be given in detail concerning a principle for estimating the state of the primary aggregate 40 and the secondary aggregate 42 (a principle of determining a good quality of the electrode ink).

Figures 2A, 2B, 2C, 2D:
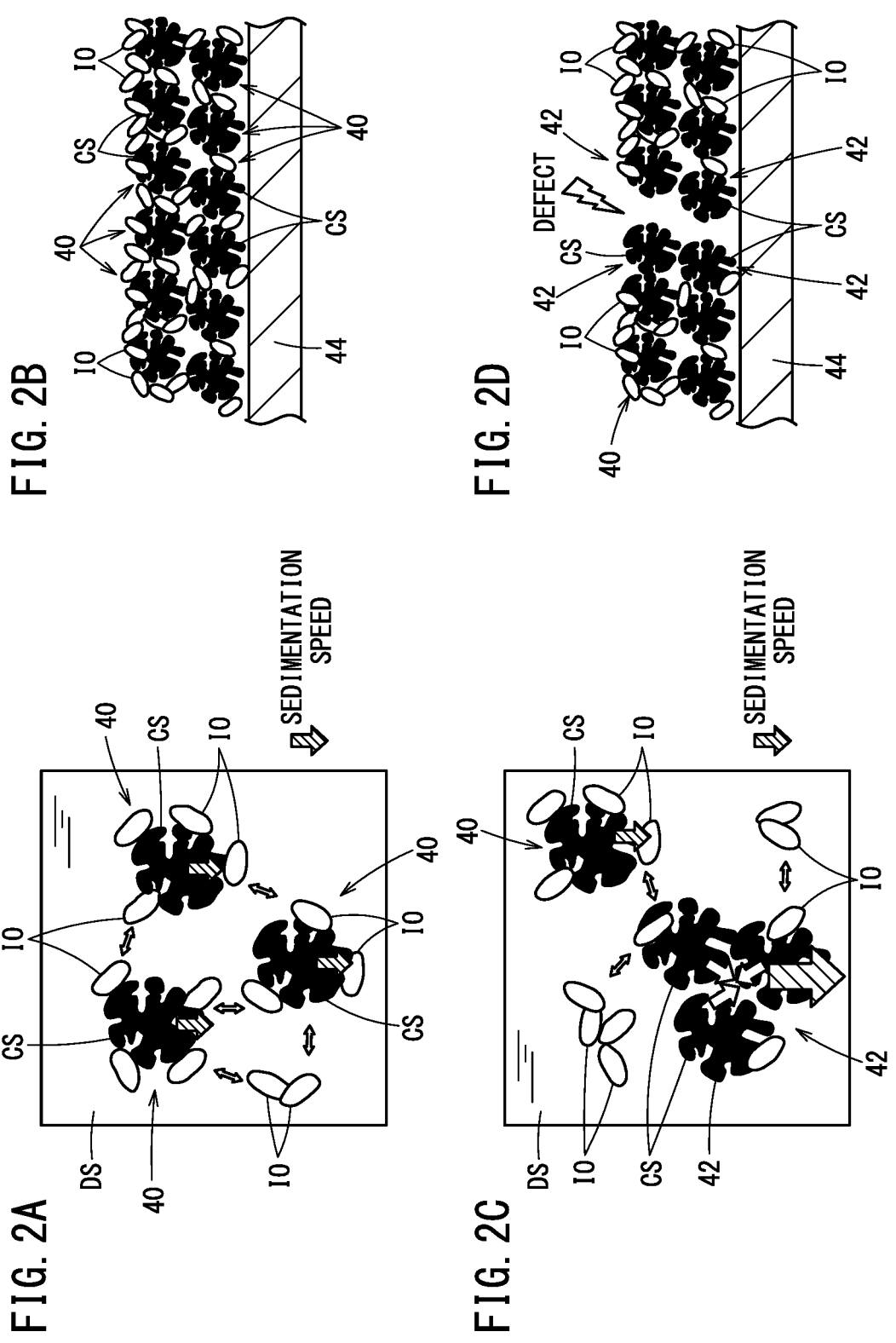
FIG. 2A is an explanatory view showing the formation of a primary aggregate of the electrode ink.
FIG. 2B is an explanatory diagram showing a dry coated surface after the electrode ink having a large amount of the primary aggregate has been coated thereon.
FIG. 2C is an explanatory view showing the formation of a secondary aggregate of the electrode ink.
FIG. 2D is an explanatory diagram showing a dry coated surface after the electrode ink having a large amount of the secondary aggregate has been coated thereon.

Among the electrode materials that make up the electrode ink, the catalyst supports CS are a hydrophobic material, and the catalyst supports CS alone cannot be uniformly dispersed within the dispersive solvent DS. On the other hand, in the case that the ionomers IO are uniformly present in the dispersive solvent DS, as shown in FIG. 2A, the ionomers IO can be adsorbed with respect to almost all of the catalyst supports CS, and further, the ionomers IO are capable of uniformly and thoroughly covering the surface of the catalyst supports CS. Consequently, the primary aggregate 40 is formed around the catalyst supports CS with the ionomers IO acting as a three dimensional barrier, and the primary aggregate 40 itself becomes placed in a state of being mutually dispersed within the dispersive solvent DS.

In addition, as shown in FIG. 2B, in a state in which the electrode ink having a large amount of the primary aggregate 40 is coated on a substrate material 44 by means of a coating process, the ionomers IO which have been absorbed on the primary aggregate 40 exist uniformly on the coated surface. Therefore, the dried catalyst layer is capable of forming a layer having a substantially constant thickness without the occurrence of any defects (cracks or the like) on the dry coated surface.

In contrast thereto, as shown in FIG. 2C, in the case that the ionomers IO are non-uniformly present in the dispersive solvent DS, the ionomers IO which are absorbed around the catalyst supports CS become the primary aggregate 40, while on the other hand, by the catalyst supports CS themselves being aggregated or clumped together at locations where the ionomers IO are not absorbed, the secondary aggregate 42 is formed. The secondary aggregate 42 becomes of a higher density than the primary aggregate 40 due to the aggregation of the catalyst supports CS themselves.

Further, the electrode ink having a large amount of the secondary aggregate 42, as shown in FIG. 2D, in the case of being coated on the substrate material 44, forms locations in which the ionomers IO are insufficient due to the presence of the secondary aggregate 42. For this reason, in the dried catalyst layer, defects such as cracks on the dry coated surface are generated, thereby forming unevenness (a non-constant thickness), and lowering the product quality of the electrodes.

In other words, the electrode ink having a large amount of the primary aggregate 40 relative to the secondary aggregate 42 (almost none of the secondary aggregate 42 is present) becomes a good quality product. Conversely, the electrode ink having a small amount of the primary aggregate 40 relative to the secondary aggregate 42 becomes a bad quality product. However, in the state in which the primary aggregate 40 is few in amount relative to the secondary aggregate 42, there is included a state in which the amount of the primary aggregate 40 is greater than the amount of the secondary aggregate 42.

In the method of determining a good quality of the electrode ink according to the present embodiment, as the index correlated with the amount of the primary aggregate 40 and the amount of the secondary aggregate 42, as noted previously, the change over time of the hydrostatic pressure P of the electrode ink is detected. More specifically, as in the above-described Equation (1), the hydrostatic pressure P of the electrode ink is proportional to the density ρ of the electrode ink. In addition, the density ρ of the electrode ink changes over time due to the influence of sedimentation of the primary aggregate 40 and the secondary aggregate 42. Stated otherwise, the change over time of the hydrostatic pressure P of the electrode ink (the density ρ of the electrode ink) in a stationary state (a state in which no external force is applied other the atmospheric pressure) serves as an index correlated with both the sedimentation speed of the primary aggregate 40, and the sedimentation speed of the secondary aggregate 42.

Furthermore, as noted previously, from the fact that the density of the secondary aggregate 42 is greater than the density of the primary aggregate 40, the sedimentation speed of the secondary aggregate 42 is faster than the sedimentation speed of the primary aggregate 40. Accordingly, in the case that the hydrostatic pressure P of the electrode ink changes quickly over time, a large amount of the secondary aggregate 42 undergoes sedimentation rapidly, whereas on the other hand, in the case that the hydrostatic pressure P of the electrode ink changes slowly over time, a small amount (or almost none) of the secondary aggregate 42 undergoes sedimentation.

More specifically, in the method of determining a good quality of the electrode ink, on the basis of the index (the change over time of the hydrostatic pressure P of the electrode ink) detected by the detection unit 20, the amount of the primary aggregate 40 and the amount of the secondary aggregate 42 can be estimated. In the case that the change over time of the hydrostatic pressure P of the electrode ink is slow, the primary aggregate 40 becomes plentiful relative to the secondary aggregate 42, and it can be said that such an electrode ink is a good quality product. Conversely, in the case that the change over time of the hydrostatic pressure P of the electrode ink is rapid, the primary aggregate 40 becomes few in amount relative to the secondary aggregate 42, and it can be said that such an electrode ink is a defective product.

Figure 3:
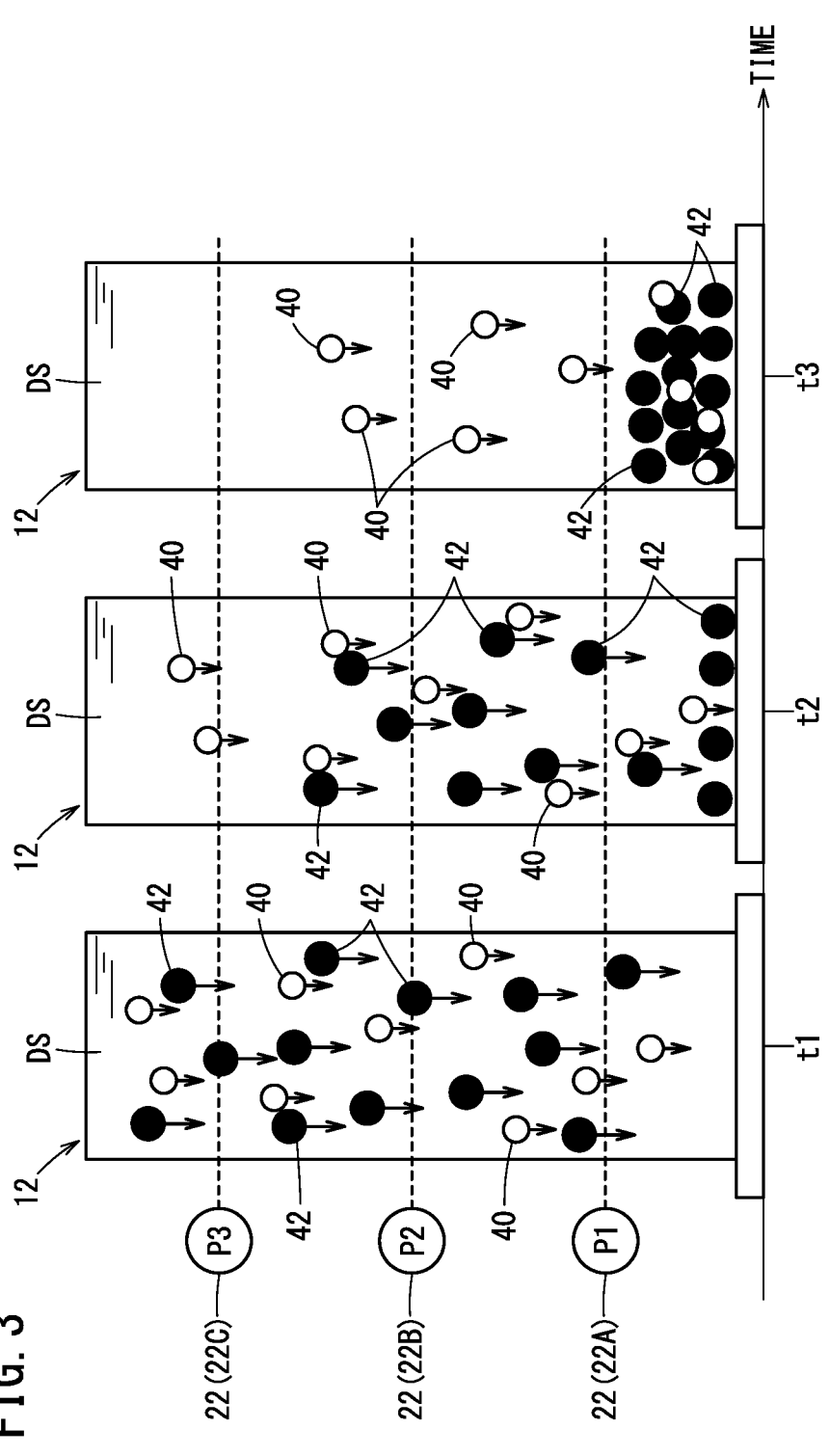
FIG. 3 is an explanatory diagram showing sedimentation of the primary aggregate and the secondary aggregate of the electrode ink stored inside a container at each of respective times.

Therefore, on the basis of the first to third measurement data detected by the detection unit 20, the measurement system 10 monitors the change over time of the hydrostatic pressure P of the electrode ink. Specifically, in the electrode ink, by the electrode material being pulverized, kneaded, and stirred or the like in accordance with the kneading process, the primary aggregate 40 and the secondary aggregate 42 are spread out in the dispersive solvent DS after the kneading process. Thus, as shown in FIG. 3, at an initial point in time t1 when the electrode ink after the kneading process (prior to the coating process) is stored in the container 12, the primary aggregate 40 and the secondary aggregate 42 are freely floating from the upper portion to the lower portion of the dispersive solvent DS inside the container 12.

Figure 4:
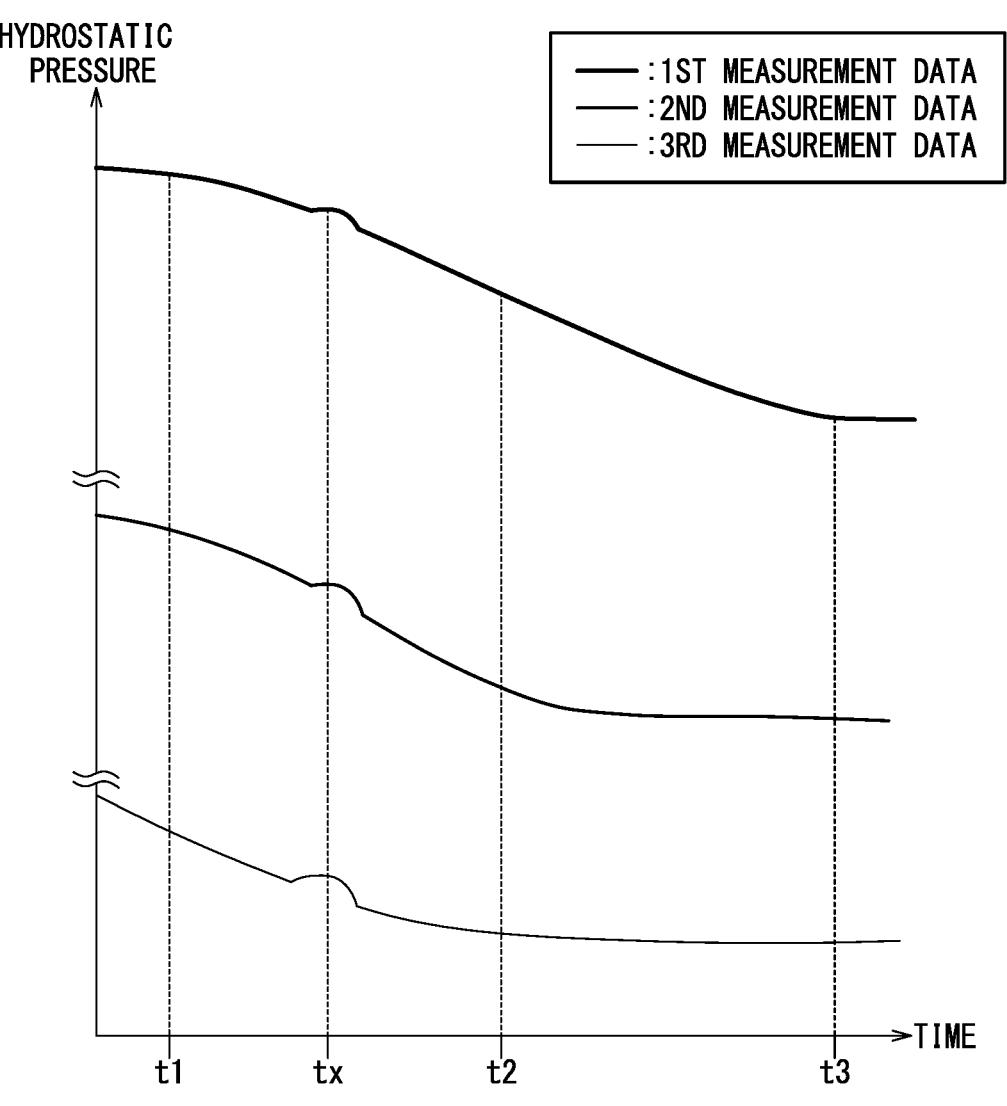
FIG. 4 is a graph illustrating a change over time of first to third measurement data detected by first to third pressure detection units.

At the point in time t1, as shown in FIG. 4, the first pressure detection unit 22A, the second pressure detection unit 22B, and the third pressure detection unit 22C detect the first to third measurement data in which the hydrostatic pressures P are mutually different from each other. More specifically, the distance from the detection positions of each of the pressure detection units 22 provided in the container 12 until reaching the liquid surface (the liquid height h of Equation (1)) becomes sequentially smaller in order of the first pressure detection unit 22A, the second pressure detection unit 22B, and the third pressure detection unit 22C. Thus, in accordance with the liquid height h, the first measurement data, the second measurement data, and the third measurement data indicating the hydrostatic pressure P also become smaller in this order.

Returning to FIG. 3, as time elapses with the electrode ink remaining in a stationary state, the primary aggregate 40 and the secondary aggregate 42 gradually undergo sedimentation within the dispersive solvent DS. However, since the electrode ink is of a high viscosity, the sedimentation speed of the primary aggregate 40 and the sedimentation speed of the secondary aggregate 42 tend to be quite slow. In addition, as noted previously, since the secondary aggregate 42 undergoes sedimentation more rapidly than the primary aggregate 40, at the point in time t2 after a certain amount of time (for example, four days) has elapsed from the point in time t1, a state is brought about in which, at an upper region of the dispersive solvent DS, the amount of the secondary aggregate 42 becomes less plentiful, whereas a large amount of the primary aggregate 40 remains.

Therefore, as shown in FIG. 4, the rate of decrease in the third measurement data of the third pressure detection unit 22C becomes significantly less in the vicinity of the point in time t2. On the other hand, in the first measurement data of the first pressure detection unit 22A, since the primary aggregate 40 and the secondary aggregate 42 are present there, the rate of decrease thereof does not become smaller even when reaching the point in time t2.

Returning to FIG. 3, at the point in time t3 after more time (for example, four days) has elapsed from the point in time t2 in the state with the electrode ink remaining stationary, a large amount of the secondary aggregate 42 undergoes sedimentation to the lower portion of the dispersive solvent DS. Thus, almost none of the secondary aggregate 42 is present in the upper portion of the dispersive solvent DS, and the amount of the primary aggregate 40 also becomes less plentiful. In the intermediate portion of the dispersive solvent DS as well, some degree of the primary aggregate 40 becomes present.

Thus, as shown in FIG. 4, the rate of decrease in the first measurement data of the first pressure detection unit 22A becomes significantly less in the vicinity of the point in time t3. Moreover, the rate of decrease in the second measurement data of the second pressure detection unit 22B becomes significantly less between the point in time t2 and the point in time t3. In this manner, the first to third measurement data of the respective times stored in the memory are pressures that differ mutually from each other, and further, exhibit an aspect in which each of the respective pressures gradually decreases.

The information processing device 30 estimates the state of the primary aggregate 40 and the secondary aggregate 42 in the electrode ink based on the changes over time in the first to third measurement data. For example, the information processing device 30 includes a change threshold value Th corresponding to the change over time of the hydrostatic pressure P of the electrode ink. In addition, as shown in FIG. 5, in the case that a decrease of the hydrostatic pressure P (for example, the first measurement data) of the electrode ink is slower than the change threshold value Th, the information processing device 30 determines that the primary aggregate 40 is more plentiful in relation to the secondary aggregate 42. On the other hand, in the case that the decrease of the hydrostatic pressure P of the electrode ink is faster than the change threshold value Th, the information processing device 30 determines that the primary aggregate 40 is less plentiful in relation to the secondary aggregate 42. In accordance with this feature, the information processing device 30 is capable of accurately estimating the state of the primary aggregate 40 and the secondary aggregate 42 of the electrode ink.

Further, by the information processing device 30 using the detection results (the first to third measurement data) of the plurality of the pressure detection units 22 while monitoring the hydrostatic pressure P of the electrode ink, it is possible to presume the generation of disturbances such as vibrations or changes in temperature or the like. For example, as shown in FIG. 4, in the case that the first to third measurement data have been changed at a synchronized timing (the point in time tx), the information processing device 30 determines that a disturbance has been generated in the electrode ink, and excludes such a change from the pressure information. Consequently, it is possible to suitably extract only the change in the density ρ of the electrode ink caused by sedimentation of the primary aggregate 40 and the secondary aggregate 42.

Furthermore, since particles of the electrode ink (including the primary aggregate 40 and the secondary aggregate 42) do not undergo sedimentation uniformly, there may be cases in which the change over time of the first to third measurement data may be shifted from one another. Thus, the information processing device 30 comprehensively monitors the change over time of the first to third measurement data, and by analyzing in detail the state of the changes over time of the primary aggregate 40 and the secondary aggregate 42, the electrode ink may be determined as being a good quality product or a defective product. For example, at an initial stage of the measurement period of the measurement system 10, the change over time of the third measurement data in which the upper portion of the container 12 is detected may be used, at an intermediate stage of the measurement period, the change over time of the second measurement data in which the intermediate portion of the container 12 is detected may be used, and at a final stage of the measurement period, the change over time of the first measurement data in which the lower portion of the container 12 is detected may be used.

Figure 6:
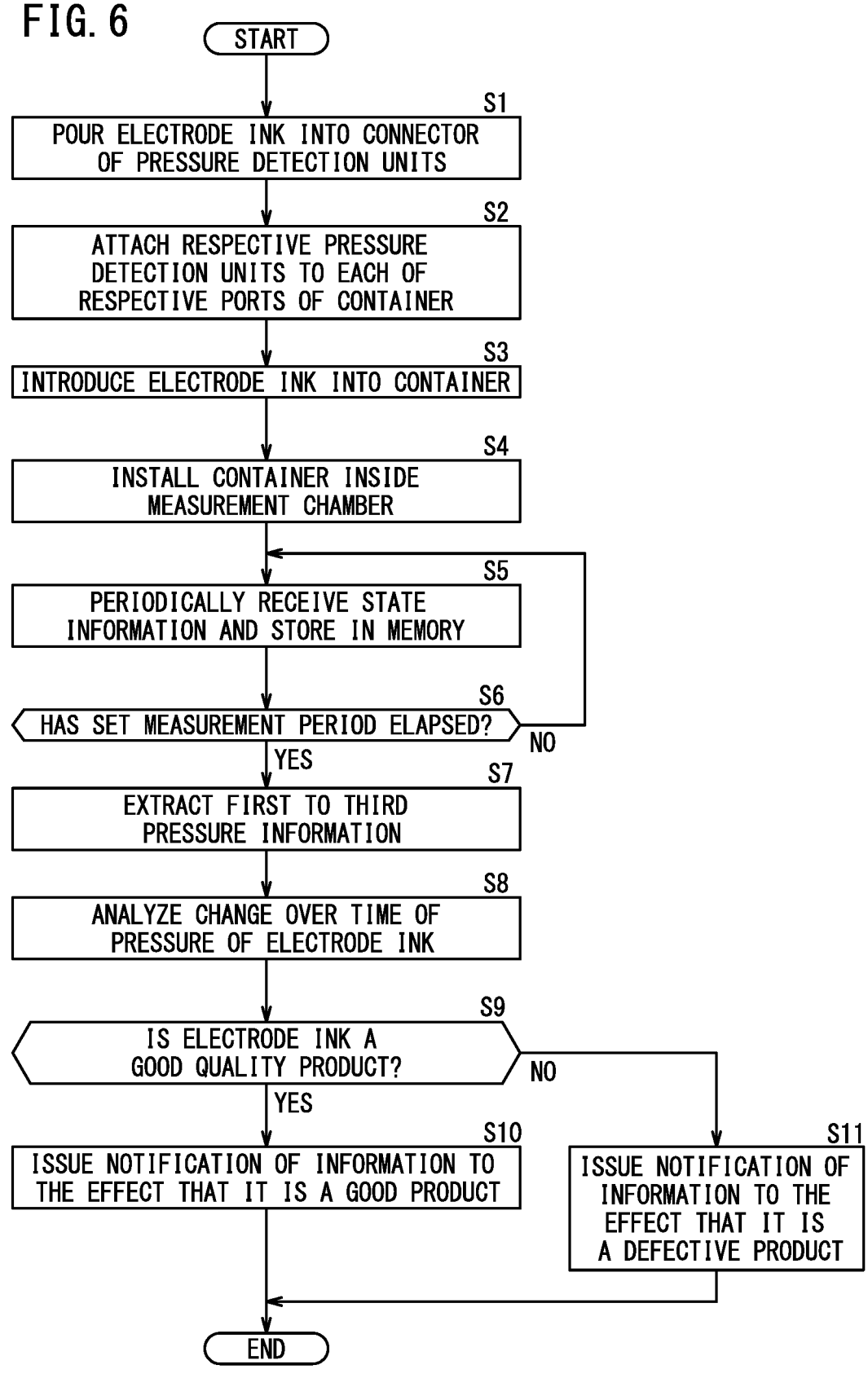
FIG. 6 is a flowchart illustrating the method of determining a good quality of an electrode ink.

The measurement system 10 according to the present embodiment is basically configured in the manner described above. Next, a description will be given with reference to FIG. 6 concerning the method of determining a good quality of the electrode ink.

Specifically, in the method of determining a good quality of an electrode ink, the user pours a portion of the electrode ink that serves as a measurement object into the detection space of the connectors 26 of each of the pressure detection units 22 (step S1). Thereafter, the user attaches the respective pressure detection units 22 to each of the ports 18 of the container 12 (step S2). Furthermore, the user stores (introduces) the electrode ink that serves as the measurement object into the container 12 of the measurement system 10 (step S3). In addition, the container 12 which includes each of the pressure detection units 22 is installed in a measurement chamber (a constant temperature chamber) in which the temperature is kept constant (step S4). In accordance with these steps, a preparation process for detecting the hydrostatic pressure P of the electrode ink is completed.

When measurement after the preparation process is started, the information processing device 30 periodically receives the hydrostatic pressures P (the measurement data) of the electrode ink detected by each of the first pressure detection unit 22A, the second pressure detection unit 22B, and the third pressure detection unit 22C, and stores the hydrostatic pressures P in the memory in association with the time information (step S5).

Further, the information processing device 30 determines whether or not the preset measurement period which is set beforehand (for example, a period of greater than or equal to one week) has elapsed (step S6), and in the case that the measurement period has not elapsed (step S6: NO), the process returns to step S5, and the detection of each of the pressure detection units 22 is continued. On the other hand, in the case that the measurement time period has elapsed (step S6: YES), the information processing device 30 stops the measurement of each of the pressure detection units 22, and together therewith, extracts the first to third measurement data that was accumulated in the memory up until that point in time (step S7). Thereafter, the user discharges the electrode ink from the container 12 and the pressure detection units 22, together with carrying out cleaning of the container 12 and the pressure detection units 22.

Further, based on the first to third measurement data that was extracted, the information processing device 30 of the measurement system 10 analyzes the changes over time of the hydrostatic pressure P (the density ρ) at each of the height positions of the container 12 (step S8). In accordance with this feature, the information processing device 30 is capable of estimating the state of the primary aggregate 40 and the secondary aggregate 42 included in the electrode ink.

Therefore, based on the change over time of the hydrostatic pressure P, the information processing device 30 determines whether or not the electrode ink is a good quality product (step S9). In the case that the change in the hydrostatic pressure P of the electrode ink is slower than the change threshold value Th which is retained in advance (step S9: YES), the information processing device 30 determines that the electrode ink is a good quality product, and issues a notification to the monitor 32 or the like of information to the effect that the electrode ink is a good quality product (step S10). Conversely, in the case that the change in the hydrostatic pressure P of the electrode ink is faster than the change threshold value Th (step S9: NO), the information processing device 30 determines that the electrode ink is a defective product, and issues a notification to the monitor 32 or the like of information to the effect that the electrode ink is a defective product (step S11).

By carrying out the process flow in the manner described above, in the method of determining a good quality of the electrode ink, prior to the coating process being implemented, it is possible for the user to recognize whether or not the electrode ink prepared in the kneading process is a good quality product. Consequently, for example, in the case that the electrode ink is defective, the user can take an appropriate countermeasure (preparation again in the kneading process, or disposal or the like). More specifically, in the method of determining a good quality of the electrode ink, it is possible to significantly increase the yield at the time of forming the electrodes of the fuel cell.

The present invention is not limited to the above-described embodiment, and various modifications can be made thereto in accordance with the essence and gist of the invention. For example, the state measurement unit provided in the container 12 may be constituted by only one of the pressure detection units 22, or may be constituted by two or four or more of the pressure detection units 22. A plurality of the pressure detection units 22 may be provided at the same height position, and the average value of the pressures detected by each of the pressure detection units 22 may be calculated. Further, in the case that a plurality of the pressure detection units 22 are applied, the installation positions of each of the pressure detection units 22 is not particularly limited, and they can be installed at appropriate positions in accordance with the amount of the electrode ink that is stored or the like.

The information processing device 30 may possess a reference value of the hydrostatic pressure P (the density ρ) of the electrode ink corresponding to the mixing ratio of the electrode materials of the electrode ink, and a time required to implement the kneading process, and at an early timing after the electrode ink has been introduced into the container, in the case that the hydrostatic pressure P deviates significantly from the reference value, the electrode ink may be determined to be a defective product. In accordance with this feature, it is possible to more effectively carry out the method of determining a good quality of the electrode ink.

Technical concepts and advantageous effects which can be grasped from the above-described embodiment will be explained below.

The first aspect of the present invention is characterized by the method of determining a good quality of the electrode ink configured to include the plurality of catalyst supports CS and the plurality of ionomers IO, and configured to form the catalyst layer of the fuel cell, wherein, in the inner portion of the electrode ink, by adsorption of the ionomers IO around the catalyst supports, the primary aggregate 40 that does not aggregate with others of the catalyst supports CS is formed, while on the other hand, by aggregation of the catalyst supports CS themselves without the ionomers IO around the catalyst supports CS, the secondary aggregate 42 is formed, the method of determining a good quality of an electrode ink comprising the steps of detecting the index correlated with the amount of the primary aggregate 40 and the amount of the secondary aggregate 42 within the electrode ink, and based on the detected index, estimating the state of the primary aggregate 40 and the secondary aggregate 42 within the electrode ink, and as the primary aggregate 40 becomes more plentifully contained within the electrode ink relative to the secondary aggregate 42, the more it is determined that the electrode ink is a good quality product.

In accordance with the foregoing, in the method of determining a good quality of the electrode ink, based on the detected index, it is possible to suitably determine whether the electrode ink is a good product or a defective product. More specifically, by estimating the state of the primary aggregate 40 and the secondary aggregate 42 from the index, prior to coating of the electrode ink, it is possible for the user to grasp that the electrode ink, in which a greater amount of the primary aggregate 40 relative to the secondary aggregate 42 is contained, is a good quality product. Consequently, the occurrence of defects on the dried surface after the electrode ink has been coated thereon is suppressed, and in manufacturing of the fuel cells, the yield is increased.

Further, the index approximately indicates a difference between the sedimentation speed of the primary aggregate 40 and the sedimentation speed of the secondary aggregate 42 in a static state of the electrode ink. In this manner, by utilizing the difference in the sedimentation speeds, the method of determining a good quality of an electrode ink is capable of accurately estimating the amount of the primary aggregate 40 and the amount of the secondary aggregate 42 in the electrode ink.

There are further included the steps of detecting, by one or more of the pressure detection units 22, the hydrostatic pressure P of the electrode ink that was introduced into the container 12, and extracting as the index the change over time of the hydrostatic pressure P in the predetermined period, and estimating the state of the primary aggregate 40 and the secondary aggregate 42 in the electrode ink based on the change over time of the hydrostatic pressure P. In accordance with this feature, in the method of determining a good quality of the electrode ink, based on the change in the hydrostatic pressure P, it is possible to more accurately estimate the state of the primary aggregate 40 and the secondary aggregate 42 within the electrode ink.

In estimating the state of the primary aggregate 40 and the secondary aggregate 42 within the electrode ink, there are further included the steps of, in the case that the change over time of the hydrostatic pressure P is less than the predetermined change threshold value Th, determining that a large amount of the primary aggregate 40 is contained within the electrode ink, and in the case that the change over time of the hydrostatic pressure P is greater than the predetermined change threshold value Th, determining that the amount of the primary aggregate 40 is relatively less in comparison with the secondary aggregate 42. In accordance with this feature, in the method of determining a good quality of the electrode ink, it becomes possible to easily distinguish between an electrode ink that is a good quality product and an electrode ink that is a defective product.

Further, a plurality of the pressure detection units 22 are provided at different positions in the height direction of the container 12, and further comprising the step of, in estimating the state of the primary aggregate 40 and the secondary aggregate 42, based on the hydrostatic pressure P detected by each of the plurality of the pressure detection units 22, determining that the electrode ink is of good quality. In accordance with this feature, in the method of determining a good quality of the electrode ink, the change over time of the hydrostatic pressure P of the electrode ink can be captured more accurately.

Further, in estimating the state of the primary aggregate 40 and the secondary aggregate 42, there is further included the step of, in the case that the hydrostatic pressure P detected by each of the plurality of pressure detection units 22 changes synchronously, recognizing that a disturbance is being applied to the electrode ink, and excluding the change of the hydrostatic pressure P. In accordance with this feature, in the method of determining a good quality of the electrode ink, it becomes possible to eliminate the influence of disturbances applied to the electrode ink, and to accurately analyze the change over time of the hydrostatic pressure P of the electrode ink.

Further, according to the second aspect of the present invention, the measurement system 10 that measures a good quality of the electrode ink is configured to include the plurality of catalyst supports CS and the plurality of ionomers IO, and is configured to form the catalyst layer of the fuel cell, wherein, in the inner portion of the electrode ink, by adsorption of the ionomers around the catalyst supports CS, the primary aggregate 40 that does not aggregate with others of the catalyst supports CS is formed, while on the other hand, by aggregation of the catalyst supports CS themselves without the ionomers IO around the catalyst supports CS, the secondary aggregate 42 is formed, wherein the measurement system 10 comprises the container 12 that stores the electrode ink, the plurality of the pressure detection units 22 provided at the plurality of different positions in the height direction of the container 12, and which periodically detect the hydrostatic pressure P of the electrode ink in the static state over the measurement period, and the information processing device 30 in which there are accumulated the hydrostatic pressure detected periodically by the plurality of the pressure detection units 22, wherein, based on the change over time of the hydrostatic pressure serving as the index correlated with the amount of the primary aggregate 40 and the amount of the secondary aggregate 42 within the electrode ink, the information processing device 30 estimates the state of the primary aggregate 40 and the secondary aggregate 42 within the electrode ink, and as the primary aggregate 40 becomes more plentifully contained within the electrode ink relative to the secondary aggregate 42, the more it is determined that the electrode ink is a good quality product. In accordance with such features, the above-described measurement system 10 makes it possible to accurately determine the goodness or badness of the electrode ink prior to coating of the electrode ink, and in accordance therewith, to suppress the occurrence of defects on the dried surface after having been coated with the electrode ink.

The invention claimed is:

1. A method of determining a good quality of an electrode ink configured to include a plurality of catalyst supports and a plurality of ionomers, and configured to form a catalyst layer of a fuel cell, wherein, in an inner portion of the electrode ink, by adsorption of the ionomers around the catalyst supports, primary aggregate that does not aggregate with others of the catalyst supports is formed, while on the other hand, by aggregation of the catalyst supports themselves without the ionomers around the catalyst supports, secondary aggregate is formed, the method of determining the good quality of the electrode ink comprising:

detecting, by one or more pressure detection units, a hydrostatic pressure of the electrode ink that was introduced into the container; and extracting as the index a change over time of the hydrostatic pressure in a predetermined period, and estimating the state of the primary aggregate and the secondary aggregate in the electrode ink based on the change over time of the hydrostatic pressure, thus detecting an index correlated with an amount of the primary aggregate and an amount of the secondary aggregate within the electrode ink; and based on the detected index, estimating a state of the primary aggregate and the secondary aggregate within the electrode ink, and as the primary aggregate becomes more plentifully contained within the electrode ink relative to the secondary aggregate, the more it is determined that the electrode ink is a good quality product, wherein the index approximately indicates a difference between a sedimentation speed of the primary aggregate and a sedimentation speed of the secondary aggregate in the static state of the electrode ink.

2. The method of determining a good quality of an electrode ink according to claim 1, wherein, in estimating the state of the primary aggregate and the secondary aggregate within the electrode ink, further comprising the steps of:

in the case that the change over time of the hydrostatic pressure is less than a predetermined change threshold value, determining that a large amount of the primary aggregate is contained within the electrode ink; and in the case that the change over time of the hydrostatic pressure is greater than the predetermined change threshold value, determining that the amount of the primary aggregate is relatively less in comparison with the secondary aggregate.

3. The method of determining a good quality of an electrode ink according to claim 1, wherein a plurality of the pressure detection units are provided at different positions in a height direction of the container, and further comprising a step of, in estimating the state of the primary aggregate and the secondary aggregate, based on the hydrostatic pressure detected by each of the plurality of the pressure detection units, determining that the electrode ink is of good quality.

4. The method of determining a good quality of an electrode ink according to claim 3, further comprising the step of, in estimating the state of the primary aggregate and the secondary aggregate, in the case that the hydrostatic pressure detected by each of the plurality of detection units changes synchronously, recognizing that a disturbance is being applied to the electrode ink, and excluding the change of the hydrostatic pressure.

5. A measurement system configured to measure a good quality of an electrode ink configured to include a plurality of catalyst supports and a plurality of ionomers, and configured to form a catalyst layer of a fuel cell;

wherein, in an inner portion of the electrode ink, by adsorption of the ionomers around the catalyst supports, a primary aggregate that does not aggregate with others of the catalyst supports is formed, while on the other hand, by aggregation of the catalyst supports themselves without the ionomers around the catalyst supports, a secondary aggregate is formed;

the measurement system comprising:

a container configured to store the electrode ink;

a plurality of pressure detection units provided at a plurality of different positions in a height direction of the container, and configured to periodically detect a hydrostatic pressure of the electrode ink in a static state over a measurement period; and an information processing device configured to accumulate the hydrostatic pressure detected periodically by the plurality of the pressure detection units;

wherein, based on a change over time of the hydrostatic pressure serving as an index correlated with an amount of the primary aggregate and an amount of the secondary aggregate, the information processing device estimates a state of the primary aggregate and the secondary aggregate within the electrode ink, and as the primary aggregate becomes more plentifully contained within the electrode ink relative to the secondary aggregate, the more it is determined that the electrode ink is a good quality product.

\* \* \* \* \*